(12) United States Patent
Andersson

(10) Patent No.: US 11,485,273 B2
(45) Date of Patent: Nov. 1, 2022

(54) ATTACHMENT OF CARGO HOLDING BELT TO A VEHICLE LOADING PLATFORM

(71) Applicant: AXEL JOHNSON INTERNATIONAL AB, Stockholm (SE)

(72) Inventor: Ragnvald Andersson, Grästorp (SE)

(73) Assignee: AXEL JOHNSON INTERNATIONAL AB, Stockholm (SE)

( * ) Notice: Subject to any disclaimer, the term of this patent is extended or adjusted under 35 U.S.C. 154(b) by 186 days.

(21) Appl. No.: 16/964,362

(22) PCT Filed: Feb. 7, 2019

(86) PCT No.: PCT/EP2019/053011
§ 371 (c)(1),
(2) Date: Jul. 23, 2020

(87) PCT Pub. No.: WO2019/154913
PCT Pub. Date: Aug. 15, 2019

(65) Prior Publication Data
US 2021/0031670 A1 Feb. 4, 2021

(30) Foreign Application Priority Data
Feb. 9, 2018 (EP) .................................. 18156066

(51) Int. Cl.
*B60P 7/08* (2006.01)
*B62D 33/03* (2006.01)

(52) U.S. Cl.
CPC ............ *B60P 7/0815* (2013.01); *B62D 33/03* (2013.01)

(58) Field of Classification Search
CPC .......... B60P 7/0815; B60P 7/08; B60P 7/0807
(Continued)

(56) References Cited

U.S. PATENT DOCUMENTS 4,167,273 A 9/1979 Hrasche
4,226,465 A * 10/1980 McCullough ......... B60P 7/0807
410/104
(Continued)

FOREIGN PATENT DOCUMENTS

DE 10 2012 108 604 4/2014
JP 6-10046 1/1994
JP 7-5920 1/1995

OTHER PUBLICATIONS

International Search Report and Written Opinion from International Application No. PCT/EP2018/053011, dated Apr. 9, 2019.

*Primary Examiner* — Stephen T Gordon
(74) *Attorney, Agent, or Firm* — Westman, Champlin & Koehler, P.A.

(57) ABSTRACT

A loading platform configured for attachment of cargo holding belts by means of a hook, the platform comprising a substantially rectangular frame supporting a loading surface, the frame including two longitudinal side members, and platform walls attached to outer sides of the frame members, inner surfaces of the platform walls delimiting a generally flat loading area. On a side facing away from the loading area each side member is provided with a protruding edge for engaging a hook of a cargo holding belt, wherein the edge extends beyond the loading area, and is received by a recess in a platform wall.

7 Claims, 4 Drawing Sheets

(58) Field of Classification Search
USPC .......... 410/97, 102, 106, 108–110, 112–116
See application file for complete search history.

(56) References Cited

U.S. PATENT DOCUMENTS

| | | | | |
|---|---|---|---|---|
| 5,547,321 | A * | 8/1996 | Thomas | B61D 45/001 |
| | | | | 410/101 |
| 6,250,861 | B1 * | 6/2001 | Whitehead | B60P 7/0815 |
| | | | | 410/104 |
| 6,939,095 | B1 * | 9/2005 | Hugg | B60P 7/083 |
| | | | | 410/116 |
| 7,556,463 | B1 * | 7/2009 | Hall | B60P 7/0815 |
| | | | | 410/104 |
| 2002/0098053 | A1 * | 7/2002 | Zubko | B62D 33/046 |
| | | | | 410/115 |

* cited by examiner

ATTACHMENT OF CARGO HOLDING BELT TO A VEHICLE LOADING PLATFORM

CROSS-REFERENCE TO RELATED APPLICATION

This Application is a Section 371 National Stage Application of International Application No. PCT/EP2019/053011, filed Feb. 7, 2019 and published as WO 2019/154913 on Aug. 15, 2019, in English, which claims priority to European Application No. 18156066.5, filed Feb. 9, 2018, the contents of which are hereby incorporated by reference in their entirety.

FIELD OF THE INVENTION

The present invention relates to cargo holding belts which can be secured to a loading platform of a vehicle. In particular, the invention relates to attachment of such belts by means of hooks engaging the edge of the loading platform.

BACKGROUND OF THE INVENTION

Some transport vehicles, such small and medium sized trucks and lorries, are equipped with loading platforms, i.e. a flat surface on which goods can be placed. The loading platform may be equipped with a variety of different body structures depending on the use of the vehicle.

In some cases, the loading platform is provided with movable sides, so called dropsides. Such dropsides are typically rotatable around one of their longitudinal sides, and releasably connectable to posts or pillars fixed to the platform. One example of a system comprising such pillars and dropsides is the Armaton® system from Forankra AB in Sweden.

In other cases, the loading platform is provided with a body forming a closed loading compartment. There are also numerous other examples of different structures which are mounted to the loading platform of a truck.

In these and other cases, it may be advantageous to provide belts for securing the cargo on the platform. Such "cargo holding belts" maybe attached with hooks to suitable structures in the loading platform.

An example of such attachment of cargo holding belts is disclosed in DE 10 2012 108 604. FIG. 1 is a reproduction of FIG. 3b of this document, and shows a hook attached to a loading platform to which rotatably dropsides are also mounted. In this prior art design, the side of the platform 1 is formed with an edge 2 around which the hook 3 may be secured. In order to allow for easy mounting of the hook 3, the edge 2 is located at a distance from the inner wall 4 of the dropside 5. As a consequence, the hook 3 and the cargo holding belt will intrude on the loading surface, and thus impact negatively on the loading capacity of the vehicle.

GENERAL DISCLOSURE OF THE INVENTION

It is an object of the present invention to provide attachment of a cargo holding belt hook to a loading platform in a way that has less negative impact the loading capacity of the vehicle.

This and other objects are achieved by a loading platform configured for attachment of cargo holding belts by means of a hook, the platform comprising a substantially rectangular frame supporting a loading surface, the frame including two longitudinal side members, and platform walls attached to outer sides of the frame members, inner surfaces of the platform walls delimiting a generally flat loading area. On a side facing away from the loading area each side member is provided with a protruding edge for engaging a hook of a cargo holding belt, wherein the edge extends beyond the loading area, and is received by a recess in a platform wall.

Contrary to prior art solutions, the recess in the side member therefore allows a hook to be connected outside the active loading area of the loading platform. Put differently, while the hook engaging edge according to prior art is located inside the outer edge of the loading area, the edge according to the present invention is located outside the outer edge of the loading platform. This allows for a more efficient use of the loading surface, while still allowing connection and disconnection of the cargo holding belt hooks with the platform walls in place.

By "active loading area" is intended to indicate the generally flat area inside the walls of the loading platform. The walls may be fixed, such as walls of a loading compartment, or be movable, such as rotatable dropsides.

The platform wall may be a so called "dropside", i.e. a wall section rotatable around an axis parallel to a side of the loading platform between a closed position, in which the dropside delimits the loading area, and an open position. The recess in the side member may then allow a hook to be connected without opening the dropside. Alternatively, the dropside may serve to "lock" the hook, i.e. the recess in the dropside may be configured to receive the hook tightly, making it impossible to remove the hook with the dropside in its closed position.

Such dropsides are typically rotatable between a closed position, in which they extend substantially vertically from the loading platform as sidewalls, and an open position, in which they hang down from the sides of the loading platform. A dropside arranged along the rear transversal element of the frame is often referred to as a tailgate. The dropsides may be of a type known per se, e.g. a dropside system under the trademark Armaton®.

The platform wall may otherwise be rigidly connected to the side member, i.e. forming more stationary walls. In this case, a lower part of the platform wall may be integrated with the side member, and the recess may be formed in this lower part. The loading platform may further be provided with a top cover (roof) and a tailgate or back door, thereby forming a closed cargo compartment.

In one embodiment, the loading platform is a modular loading platform, wherein each side member is formed by an inner frame member having at least two parallel grooves extending along an outside of the inner member, and an outer mounting element having parallel protrusions which have been inserted into engagement with the parallel grooves in the inner member, and wherein the edge is formed in said outer mounting element. The outer mounting elements then form a structure on which additional parts of the loading platform may be mounted, such as dropsides or platform walls.

The parallel grooves allow for easy and reliable attachment of the mounting elements which have corresponding protrusions which engage the grooves. The mounting elements may be slidable along the grooves while being rotationally fixed. If require, some or all of the mounting elements may be secured by suitable fastening means, such as screws. The modular loading platform thus offers a general purpose loading platform which may be easily adapted in a cost efficient manner.

When attached, the mounting elements provide a structure for mounting additional parts, such as platform dropsides, tailgate, walls, etc. The mounting elements thus provide a flexible adaptation of the frame for various uses. The same frame can thus be used in a variety of applications.

An example of a modular loading platform is disclosed in co-pending European application with title "Modular loading platform for a vehicle", filed in the same day as the present application, and herewith incorporated by reference. Such a platform comprises a substantially rectangular frame composed of a plurality of interconnected extruded frame members, the frame members including two side members, and a front member and a rear member connected transversally between the ends of the side members, wherein the rear member and the side members are each provided with at least two parallel grooves extending along the members and facing away from the frame, a set of mounting elements, each mounting element having parallel protrusions which have been inserted into engagement with the parallel grooves in one of the rear member and the side members, the mounting elements forming a structure on which additional parts of the loading platform may be mounted.

In one embodiment, the outer mounting elements may be a hinge element, and the loading platform may further comprise platform dropsides hingedly attached to the hinge elements, so as to be rotatable around an axis parallel to a side of the loading platform, wherein the recess is formed in the dropside.

In another embodiment, the mounting elements may include wall panel mounting elements forming a lower portion of fixed platform walls The side members, also referred to as "profiles", are preferably made of a light weight metal or metal alloy, such as aluminum. Aluminum profiles with desired cross-section are relatively easy to manufacture at low cost, and are available from commercial suppliers.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
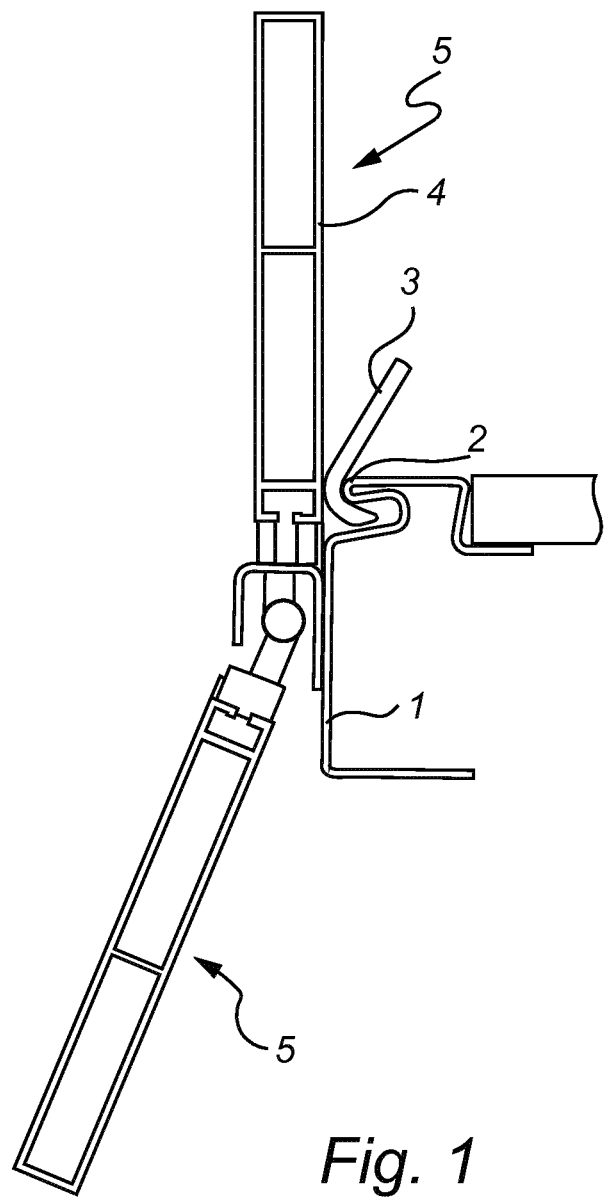
FIG. 1 shows a cargo holding belt attached to a loading platform according to prior art.
Figure 2:
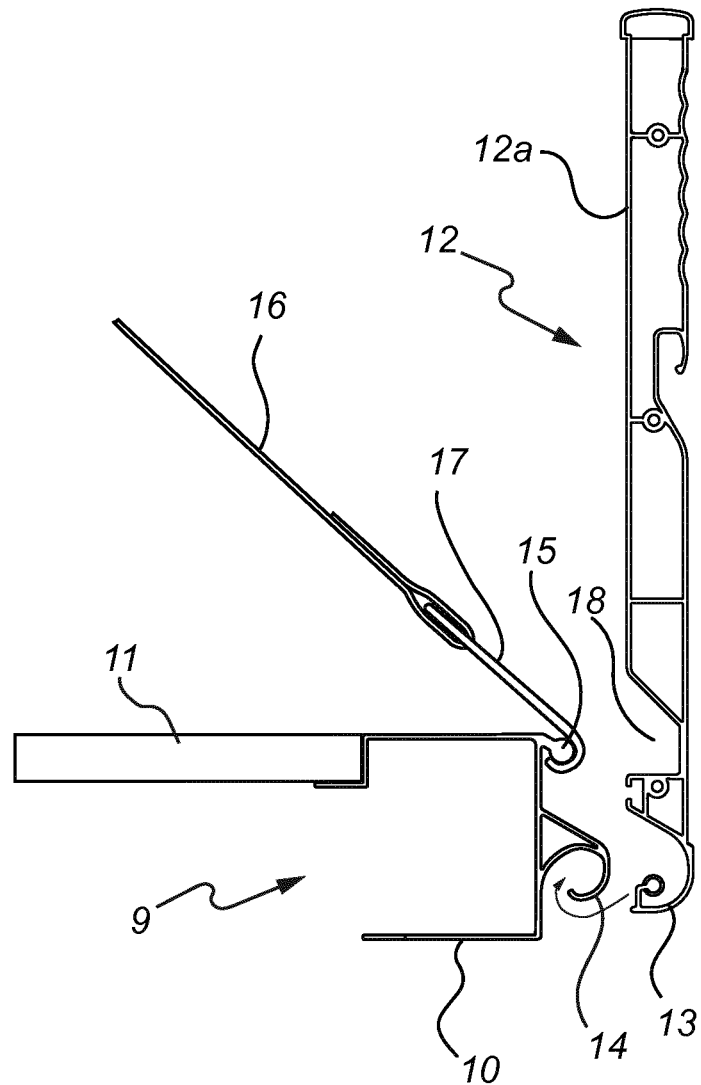
FIG. 2 shows a cargo holding belt attached to a loading platform with dropsides according to an embodiment of the present invention.

The loading platform 9 in FIG. 2 has a frame of structural members, e.g. extruded aluminum profiles, of which only one, referred to as a side member 10, is shown in FIG. 2. Of course, the frame members does not have to be extruded, but may be rolled, e.g. as was shown in FIG. 1, or otherwise manufactured. The frame supports a cargo loading surface 11, e.g. a board of aluminum, wood, plywood or suitable laminate.

Dropsides 12 are hingedly mounted to the members 10 by means of a profile portion 13 which is engaged with a hinge portion 14 formed in the member 10. The dropside 12 is thus rotatable around an axis parallel to a side of the loading platform 9 between a closed position, in which the inside 12a of the dropside 12 delimits an active loading area, and an open position, where the dropside 12 hangs from the hinge portion 14. In the illustrated case, the dropside 12 is formed by an extruded profile, e.g. an aluminum profile, and may be provided with end pieces (not shown) to seal the dropside.

The member 10 has a protruding edge 15, to which a cargo holding belt 16 may be secured by means of a hook 17. The dropside 12 is provided with a recess 18, which receives the edge and the hook 17 when the dropside 12 is in its closed position. The edge 15, and thus also the point of engagement of the hook 17, are thus located beyond the inner wall 12a of the dropside 12, and thus outside the active loading area of the platform.

Figure 3:
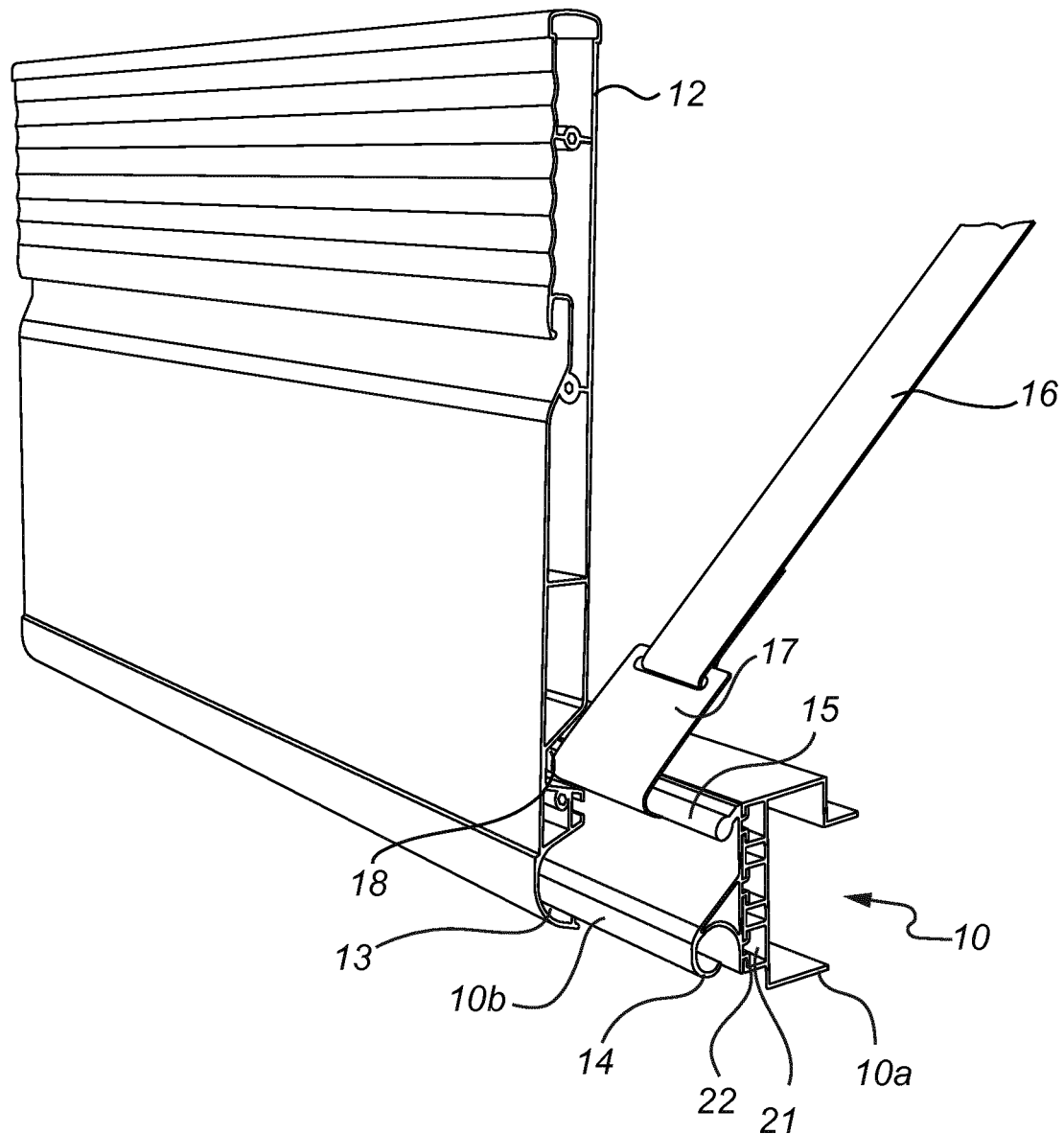
FIG. 3 shows a cargo holding belt attached to a loading platform with dropsides according to a further embodiment of the present invention.

FIG. 3 shows a further embodiment, where the loading platform is a "modular" loading platform as described in co-pending European application with title "Modular loading platform for a vehicle", filed on the same day as the present application, and herewith incorporated by reference.

In FIG. 3, each side member 10a is formed by an inner frame member 10a having at least two parallel grooves 21 extending along an outside of the inner member 10a, and an outer mounting element 10b having parallel protrusions 22 which have been inserted into engagement with said parallel grooves 21 in the inner member 10a. The edge 15, similar to the edge in FIG. 2, and the hinge portion 13, are here formed in the outer mounting element 10b. The dropside 12 is identical to the dropside in FIG. 2.

Figure 4:
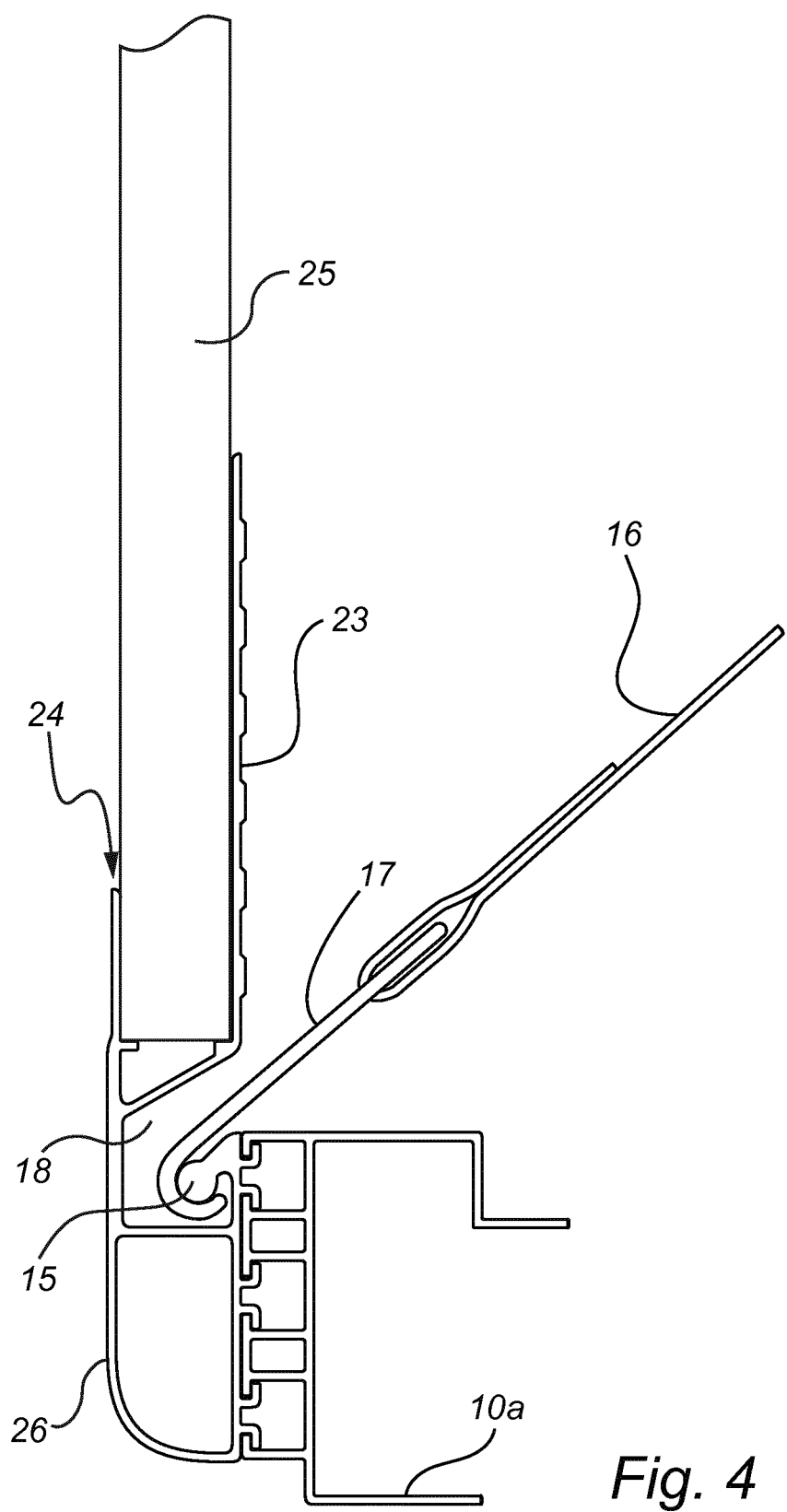
FIG. 4 shows a cargo holding belt attached to a loading platform with walls according to an embodiment of the present invention.

In yet another embodiment, shown in FIG. 4, a wall mounting element 23 is attached to the inner member 10a. Of course, the wall mounting element 23 and inner member 10a may be formed by one single profile, similar to the profile 10 in FIG. 2.

The wall mounting elements 23 have recesses 24 in which wall panels 25 may be mounted. The wall mounting element thus form a lower part 26 of rigid, fixedly mounted platform wall, and the recess 18 is formed in this lower part 26. An edge 15 for connecting a hook 17 is provided in a similar manner as in FIGS. 2 and 3.

The person skilled in the art realizes that the present invention by no means is limited to the preferred embodiments described above. On the contrary, many modifications and variations are possible within the scope of the appended claims. For example, the exact design of the profile cross sections may deviate from what is shown herein, without departing from the inventive concept. Also, the shape of the hooks and the hook engaging edges may be modified depending on the application.

The invention claimed is:

1. A loading platform configured for attachment of cargo holding belts by means of a hook, said platform comprising:
   a substantially rectangular frame supporting a loading surface, said frame including two longitudinal side members, and
   platform walls attached to outer sides of said frame members, inner surfaces of said platform walls delimiting a generally flat loading area,
   wherein each side member on a side facing away from the loading area is provided with a protruding edge for engaging a hook of a cargo holding belt, and
   wherein said edge extends beyond said loading area, and is received by a recess in one of said platform walls.

2. The loading platform according to claim 1, wherein each platform wall is a dropside rotatable around an axis parallel to a side of the loading platform between a closed position, in which the dropside delimits the loading area, and an open position.

3. The loading platform according to claim 1, wherein each platform wall is rigidly connected to said side member.

4. The loading platform according to claim 3, wherein a lower part of each platform wall is integrated with the side member, and wherein said recess is formed in said lower part.

5. The loading platform according to claim 1, wherein each side member is formed by an inner frame member having at least two parallel grooves extending along an outside of the inner member, and an outer mounting element having parallel protrusions which have been inserted into engagement with said parallel grooves in the inner member, and wherein said edge is formed in said outer mounting element.

6. The loading platform according to claim 5, wherein said outer mounting elements form hinges, and wherein said platform walls are dropsides hingedly attached to said hinges, so as to be rotatable around an axis parallel to a side of the loading platform.

7. The loading platform according to claim 5, wherein said outer mounting elements include wall panel mounting elements forming a-lower portions of said platform walls.

* * * * *